(12) United States Patent
Laubach et al.

(10) Patent No.: US 8,587,441 B2
(45) Date of Patent: Nov. 19, 2013

(54) WATER FLOW DETECTOR

(75) Inventors: William F. Laubach, Elk Grove Village, IL (US); James M. Murphy, St. Charles, IL (US)

(73) Assignee: Honeywell International Inc., Morristown, NJ (US)

( * ) Notice: Subject to any disclaimer, the term of this patent is extended or adjusted under 35 U.S.C. 154(b) by 409 days.

(21) Appl. No.: 12/974,637

(22) Filed: Dec. 21, 2010

(65) Prior Publication Data

US 2012/0152044 A1 Jun. 21, 2012

(51) Int. Cl.
*G08B 21/00* (2006.01)
(52) U.S. Cl.
USPC .............................. 340/608; 340/603; 340/606

(58) Field of Classification Search
USPC .......................................................... 340/608
See application file for complete search history.

(56) References Cited

U.S. PATENT DOCUMENTS

| | | | |
|---|---|---|---|
| 4,782,333 A | | 11/1988 | Merchant |
| 4,951,915 A | * | 8/1990 | Piao ................................. 251/14 |
| 6,331,820 B1 | * | 12/2001 | Borbath et al. ............... 340/606 |
| 7,313,973 B2 | | 1/2008 | Shachar et al. |
| 2009/0261278 A1 | * | 10/2009 | Murphy et al. ................. 251/50 |

* cited by examiner

*Primary Examiner* — Kerri McNally
(74) *Attorney, Agent, or Firm* — Husch Blackwell (57) ABSTRACT

A water flow detector has a gear driven timer responsive to the movement of a lever. The lever is connected to a paddle and the paddle is responsive to the flow of water in a pipe. The detector via the gear driven timer responds to the flow of water in the pipe.

11 Claims, 8 Drawing Sheets

FIG. 8

WATER FLOW DETECTOR

FIELD OF THE INVENTION

The present disclosure concerns a water flow detector having a gear driven timer responsive to the movement of a lever; the lever connected to a paddle is itself responsive to the flow of water in a pipe.

BACKGROUND OF THE INVENTION

Water flow detectors having a timer responsive to movement of a lever connected to a paddle are known. A known water flow detector uses an air bleed timer. U.S. Pat. No. 6,331,820 discloses a paddle type flow detector which relies on an air bleed timer. U.S. Pat. No. 4,782,333 discloses an air bleed timer. Both of these patents are incorporated herein by reference.

In general a water flow detector using an air bleed timer has a cam. The cam, when in a first position, maintains a switch assembly in a first state. The cam when in a second position enables the switch assembly to orient to a second state. The lever when moved to a second position enables the cam to move from the first position to the second position. The time it takes the cam to move depends upon the rate at which air is set to bleed out of an air chamber formed by a diaphragm. If the air is set to bleed out quickly, the cam will move quickly from the first to the second position. If the air is set to bleed out slowly, the cam will move slowly from the first to the second position and it will take longer for the switch to orient itself from the first to the second state.

The lever is moved from the first position to the second position by the flow of water in a riser pipe of a fire sprinkler assembly. The water causes the paddle to move from a first to a second position. If the lever is not in the second position, the cam cannot move from the first to the second position. Accordingly the switch can not orient from the first state to the second state. Whether the cam moves from the first to the second position depends on the rate of air bleed and the duration of suitable water flow. If the water flow stops before the air bleed is complete, the cam will be moved back to the first position by the lever prior to the cam moving to the second position. The switch will not orient to the second state. For instance, if the bleed duration is 50 seconds then the cam will move from the first to the second position in 50 seconds so long as the lever is maintained in the 2$^{nd}$ position by the water flow. If the lever is not maintained in a second position by the water flow for 50 seconds then the cam will not be able to move to the second position. The switch will not orient to the second state. Accordingly the longer the bleed time, the longer the water flow most continue for the switch to orient from the first to the second state. The shorter the bleed time the shorter amount of time the water flow most continue for the switch to orient from the first state to the second state. To ensure against false alarms from pressure fluctuations in the sprinkler system, a long bleed time can be helpful.

DETAILED DISCLOSURE

Figure 1:
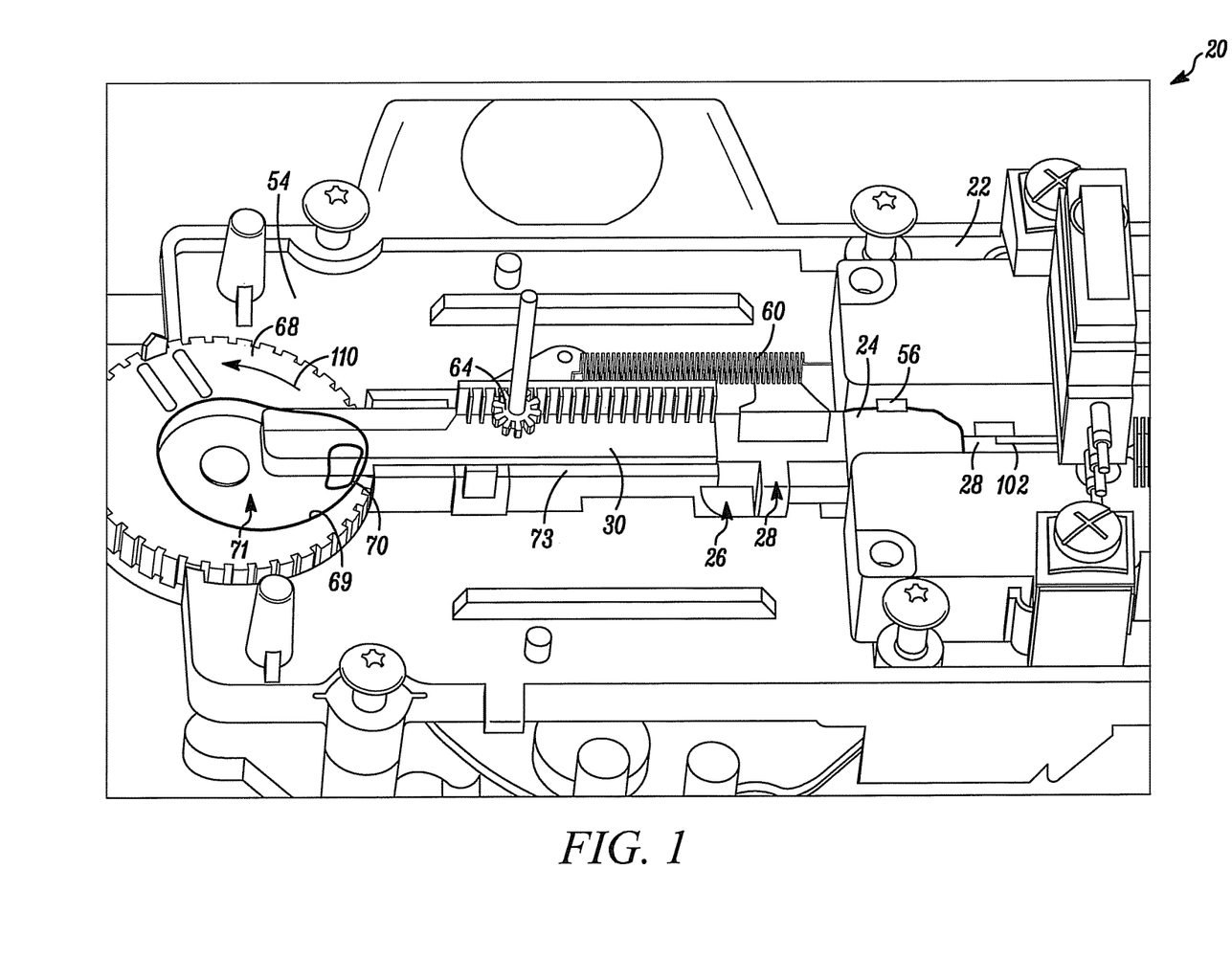
FIG. 1 is a top sided perspective view of a partial assembly of a water flow detector embodying the present invention; the assembly is oriented so that a rack is set in a first position to provide maximum interference against movement of an interface and a cam.
Figure 2:
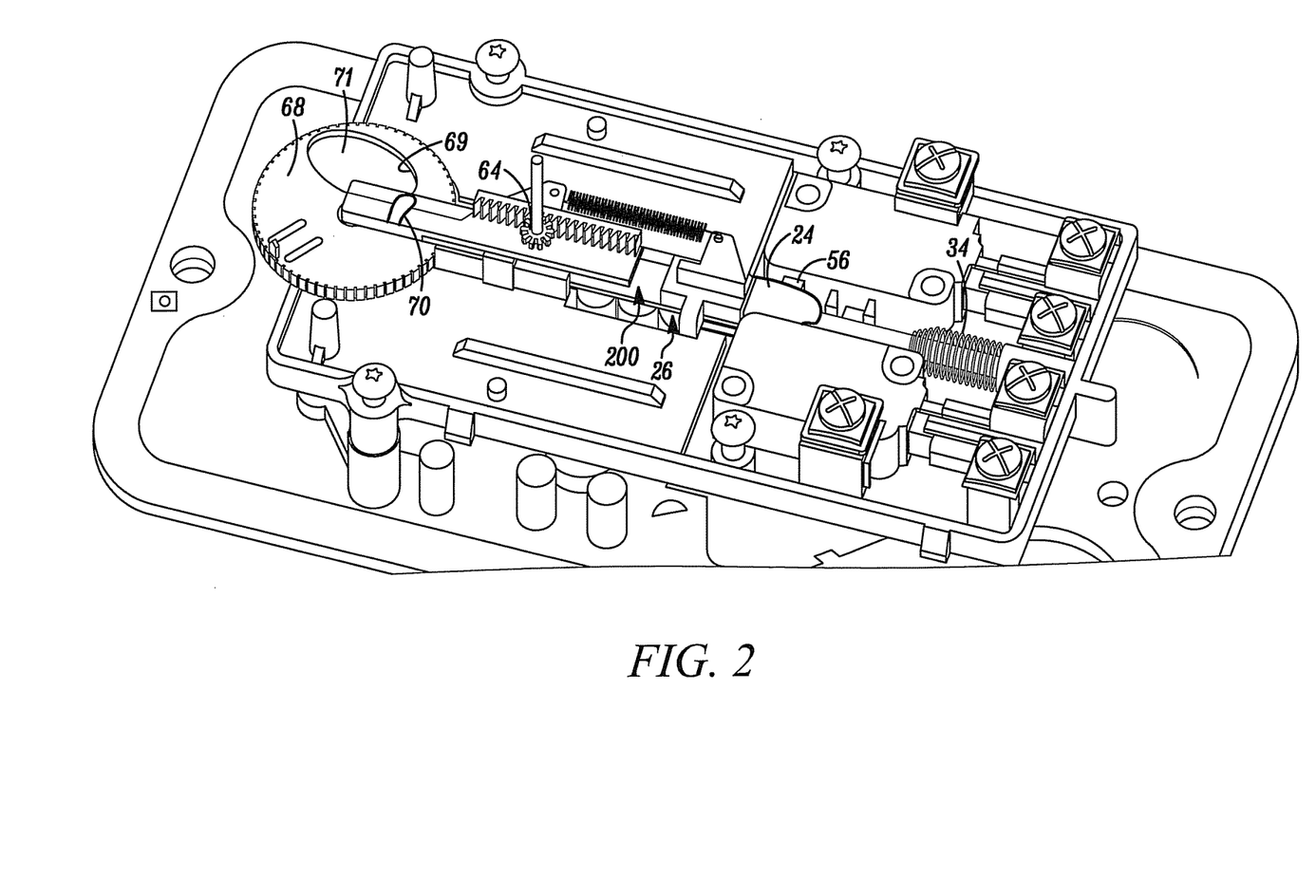
FIG. 2 is a top side perspective view of the assembly shown in FIG. 1 except the rack is oriented to be in a first position to provide minimum interface against the movement of the interface and cam.
Figure 3:
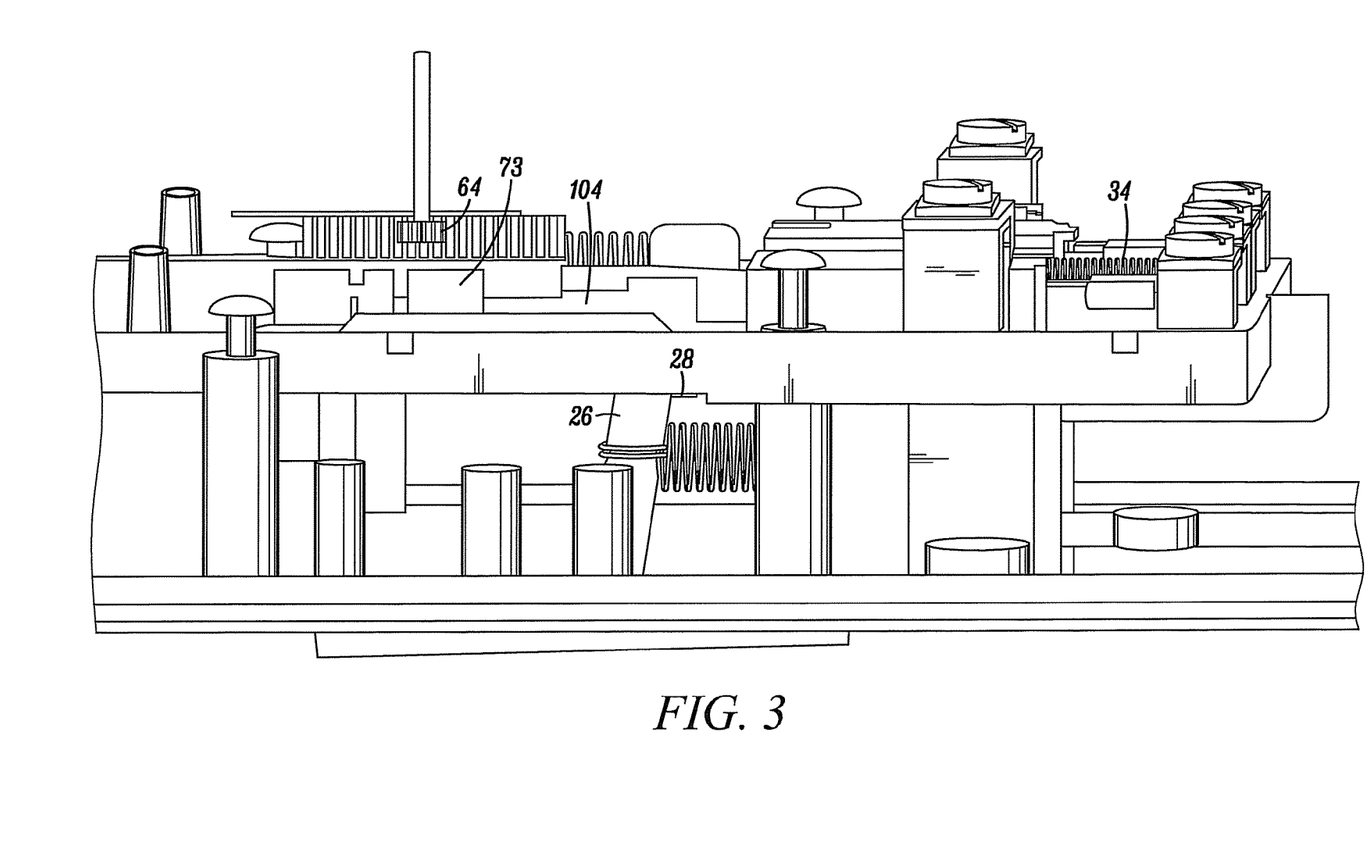
FIG. 3 is a side view of the assembly shown in FIG. 2.
Figure 4:
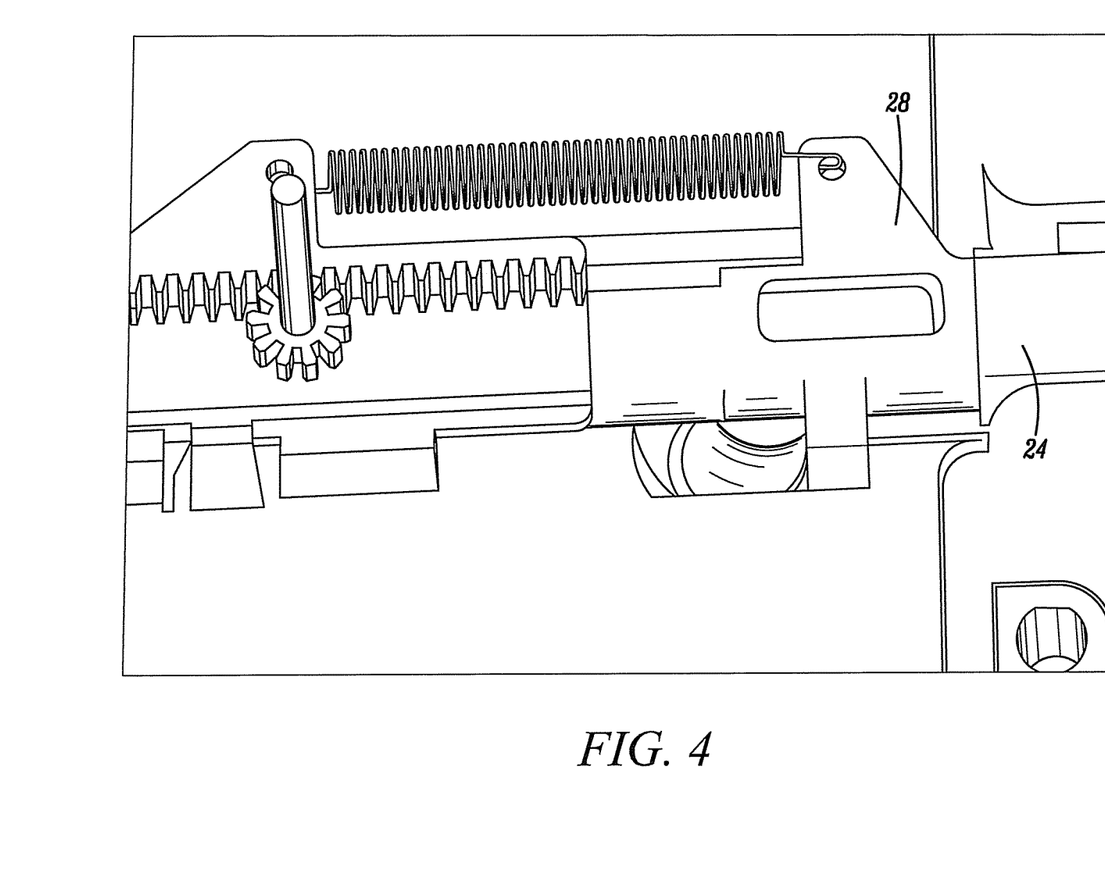
FIG. 4 is a close up top perspective view of the assembly shown in FIG. 2

Referring to FIGS. 1 and 2 a water flow detector using an assembly to control actuation of a switch assembly is shown. A cam 24, when in a first position, see FIGS. 1 and 2, maintains the switch assembly 22 in a first state. In the first state the push rods 56 of the switch 22 are inward. The cam 24 when in a second position, see FIG. 6, enables the switch assembly 22 to orient to a second state. In the second state the push rods 56 extend outward. A lever 26 when moved to a second position, see FIGS. 5 and 6, from a first position, see FIGS. 1, 2 and 3, enables an interface 28 to move the cam 24 from the first position to the second position. The lever 26 thus when in the first position prevents the interface 28 from moving the cam 24 into the second position. The lever 26 when in the first position orients the interface in a position which places the cam 24 in the first position. The lever is in the second position when it allows the interface to move the cam 24 into the second position. In the first position, the lever 26 is pushing on the interface 28. In the second position, the lever is off the interface. The time it takes the interface to move the cam 24 from the first position to the second position depends upon the linear distance a gear rack 30 of the gear assembly 32 must travel to move from a first position, see FIGS. 1 and 2, to a second position, see FIGS. 5 and 6. The rack 30 is in a second position when it has moved linearly into a position which has enabled the interface 28 to move the cam 24 into the second position. The rack 30 is in the first position when it is in a position which provides a set maximum interference to the interface 28 moving the cam to the second position. The rate at which the rack moves from the first position to the second position is determined by the construction of a series of gears (64 and 66) powered by the movement of the gear rack and the construction of a spring 34 which pushes the interface into the rack. If the rack is set to travel a long distance to move from the first position to the second position, see FIG. 1, the interface will take a longer time to move the cam from the first position to the second position than if the rack is set to travel a shorter distance to move from the first position to the second position, see FIG. 2. If the lever 26 is not in the second position, the interface cannot move the cam from the first to the second position. Accordingly the switch 22 cannot orient from the first state to the second state. The flow of water 100, sufficiently strong, in a riser pipe of a fire sprinkler assembly causes a paddle 36 to move from a first to second position and the lever connected to the paddle to move from the first position to the second position.

Whether the interface 28 moves the cam 24 from the first to second position depends upon the distance the rack has to travel to reach the second position from the first position and the duration of suitable water flow. If suitable water flow stops before the rack 30 moves to the second position, the cam 24 will be moved back by the interface to first position prior to the cam being moved to the second position. The rack 30 will also be moved back to its first position. The switch will not orient to the second state. For instance, if the rack is set to travel a linear distance of 4 mm to reach the second position from the first position, than interface 30 will move the cam 24 from the first to the second position when the rack has moved 4 mm so long as the lever is maintained in the $2^{nd}$ position by the water flow. If the lever is not maintained in the second position by the water flow until the rack moves 4 mm, then the interface will not be able to move the cam to the second position. The lever, rather 26 will move the interface into the cam 24 thereby moving the cam and rack 30 back to the first position. The switch will not orient to the second state. Accordingly the longer the distance the rack is set to travel, the longer the water flow most continue for the switch to orient from the first to the second state. The shorter the distance, the shorter the amount of time the water most flow for the switch to orient from the first state to the second state. To ensure against false alarms from pressure fluctuations of the sprinkler, a longer distance of travel can be helpful.

Figure 8:
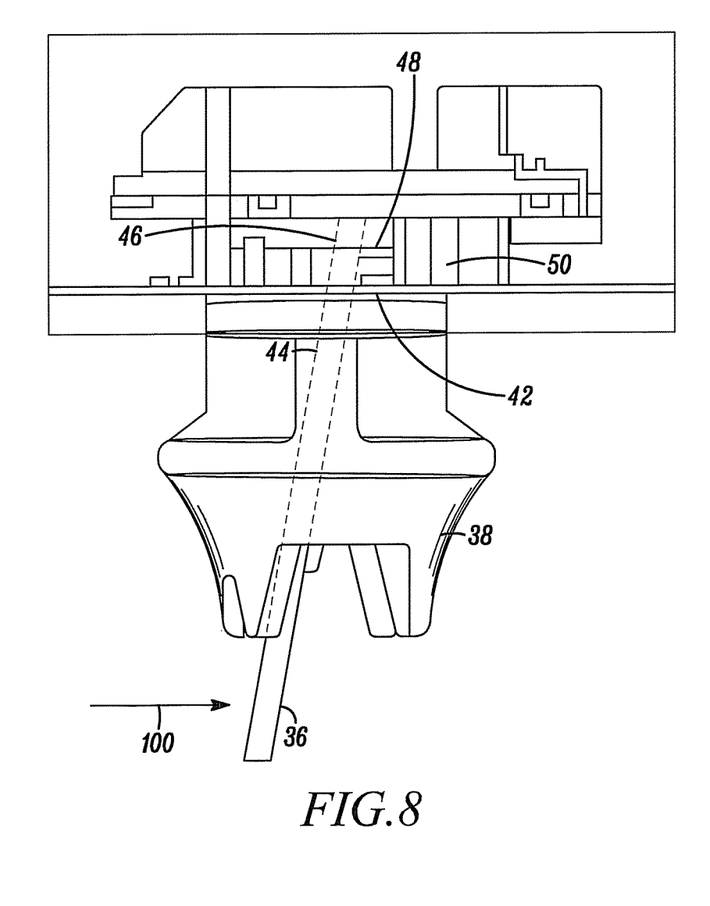
FIG. 8 is a side view of a water flow detector embodying the present invention wherein the flow detector includes a paddle and saddle mount.

In more detail the detector includes a portion which allows it to be mounted to the riser pipe. The portion can be a saddle mount 38 or a threaded coupling or another type of mount. See FIG. 8. It is important that the mount allow for the paddle 36 of the detector to be mounted in the pipe with the mount plate of the detector mounted over the pipe.

The mount plate carries a seal which is usually rubber 42. The lever has a portion which extends through the seal. The lever has a portion 44 which extends downward from the seal and from the first side of mount plate. The end of portion 44 is coupled to paddle 36. The lever has a portion 46 which extends upwardly from the seal and upwardly from the second side of the mount plate. The portion has an end coupled to an end of tension spring 48 to bias the lever in the first position against the interface 28. The other end of the spring is coupled to a spring mount 50. The spring mount extends upwardly from the second side of the mount plate.

Figure 5:
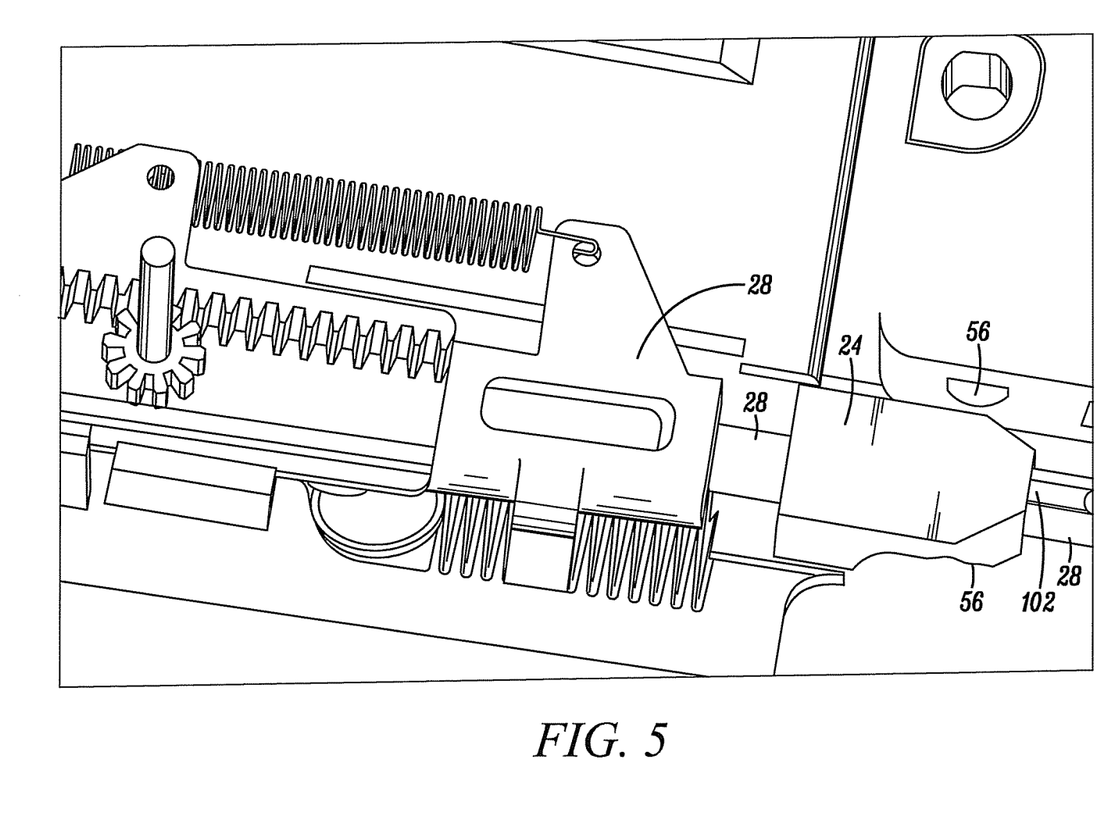
FIG. 5 is a top perspective view of the assembly shown in FIG. 2 wherein the interface is moving the rack from a first to a second position and also moving the cam from a first to a second position.
Figure 6:
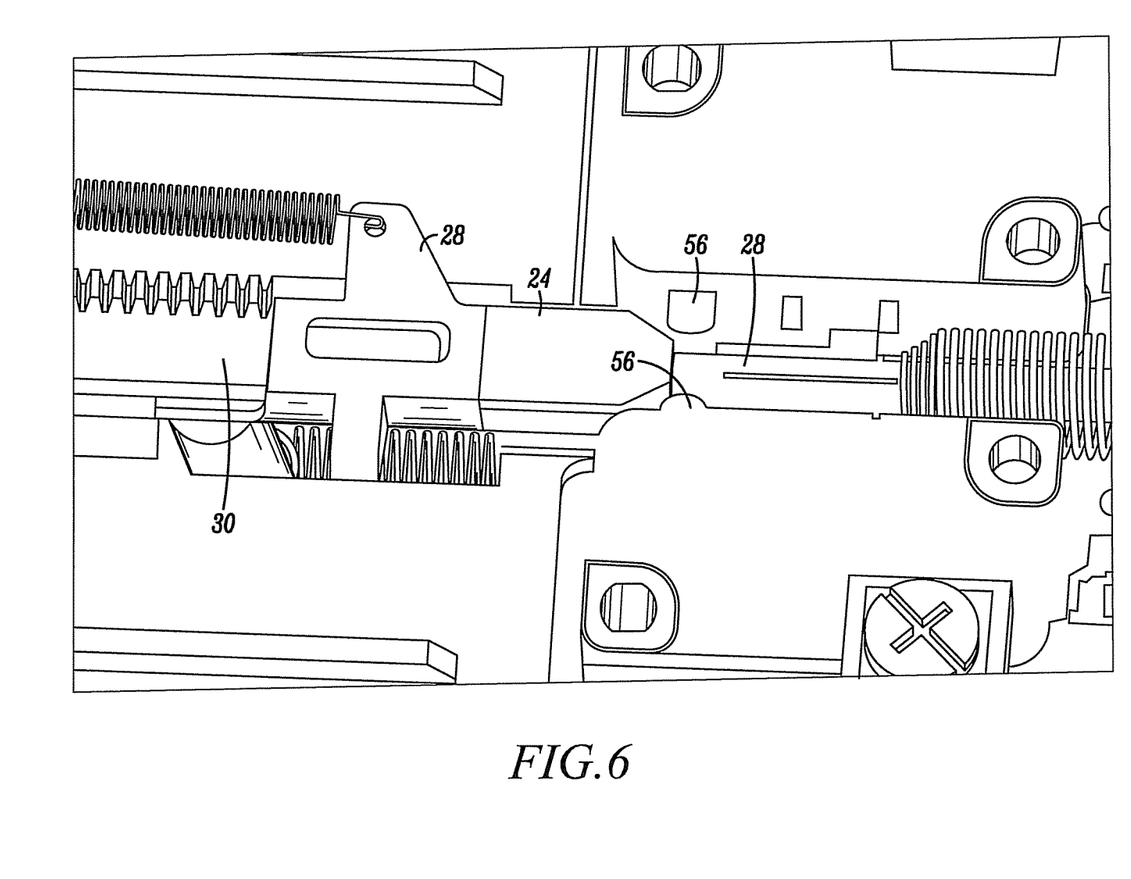
FIG. 6 is a top perspective view of the assembly shown in FIG. 5 wherein the interface has moved the rack to the second position and wherein the interface has moved the cam sufficiently toward the second position so that push rods have squeezed the cam to move to the second position.
Figure 7:
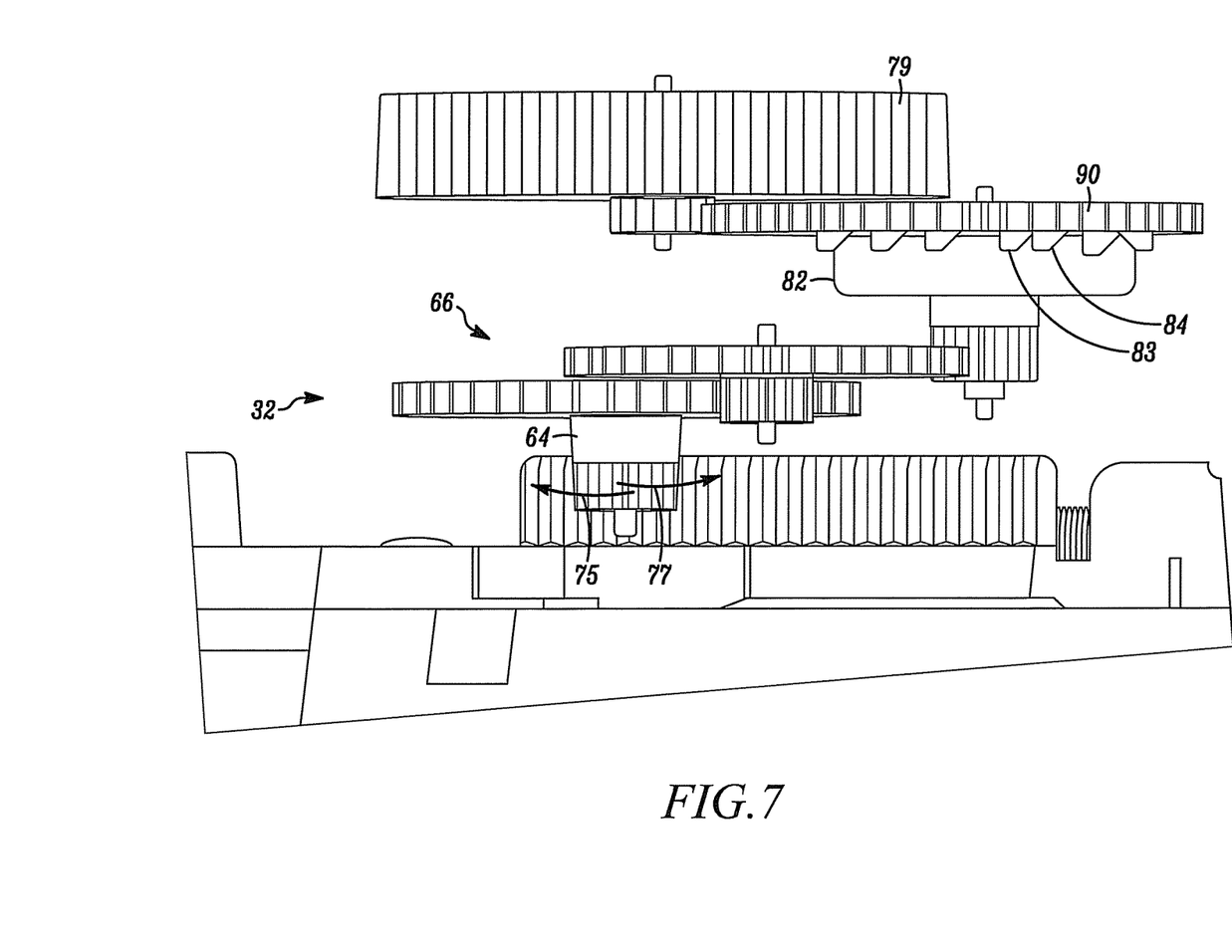
FIG. 7 is a view of the assembly shown in FIG. 1 except an assembly of timing gears is seen extending upward from the pinion gear.

Carried by the mount plate, at its second side, is the switch assembly 22 which is actuated by the linearly moveable cam 24. The switch assembly can be supported on a floor 54. The floor is carried by the mount plate at its second side. The cam 24 in FIGS. 1 and 2 is oriented in a first position which in turn orients the switch assembly in a first state. In the first state, the switch push rods 56 are pushed inwardly by the cam. The cam is oriented and pushed in the first position by the interface which itself is pushed by lever end 46 biased up against interface 28. The lever 26 in the first position pushes the interface 28 to a first position which pushes the cam into the first position. As shown in FIGS. 5 and 6, when the lever is moved off interface 28 to the second position, pusher spring 34, which is partially compressed, pushes interface 28 in the linear direction towards the second position, see FIG. 5. The interface 28 pushes into the rack 30. The pushing of the interface 28 into the rack 30 moves the rack 30. The interface also pushes the cam 24 towards the second position. An interference 102 on the interface 28 pushes the cam 24. As can be seen in FIGS. 5 and 6, the push rods 56 squeeze up against angled sides of the cam finally moving the cam into the second position. The cam when in the second position enables the push rods 56 of switch assembly 22 to orient to a second state. In the second state the push rods are extended outwardly. See FIG. 6. When the lever is pushing up against the interface, as caused by spring 48 when the water is not flowing, the interface pushes the cam into the first position. Also the interface pulls the rack 30 back to its first position. The spring 60 coupled to the interface and rack affects the pulling. The abutment of the interface 28 against the cam 24 moves the cam into the first position.

The time it takes for the cam to move from the first position, see FIGS. 1 and 2, to the second position, see FIG. 6, depends upon the linear distance the interface 28 must move gear rack 30. The movement of the rack 30 by the interface must be sufficient to enable the interface to move the cam a distance to enable the cam to be squeezed to the second position. The gear rack's movement away from the switch 22 assembly is opposed by the force required to turn pinion 64 meshed with the gear rack 30. The pinion 64 is coupled to a series of timing gears 66. If the interface only has to move the rack a short distance, see FIG. 2, the time it takes for the cam to move to the second position will be shorter then if the interface has to push the rack a longer distance. See FIG. 1.

A rotatable cam 68 enables adjustment of the rack 30. The adjustment varies the distance the rack 30 must travel to reach the second position from the first position. The second position is the position the rack is in when the interface 28 is in the second position. The first position is the position the rack is in when the interface is in the first position. The rotatable cam varies the first position at the rack.

Rotatable cam 68 when turned in direction 110 moves rack 30 in the linear direction away from the push rods. The rack is moved by the interference of rack projection 70 with cam sidewall 69. The cam has a circumferential sidewall 69 which surrounds an open area 71 into which the projection 70 extends. The sidewall 69 varies in radial thickness along its circumference. The tension spring 60 with one end connected to the rack and the other connected to the interface biases the projection 70 against the sidewall 69 when the lever is in the first position. The construction enables rotation of the rotatable cam to move the rack in the linear direction to vary the rack's set maximum interference with the interface 28 reaching the second position.

The rack is in sliding engagement with a track 73 which helps stabilize and guide the rack 30 as it moves from the first to the second position.

The interface includes a rod portion which receives compression spring 34 and supports the cam. The cam is slidably engaged to the rod. As can be seen in FIGS. 5 and 6, the push rods help squeeze up against angled sides of the cam finally moving the cam into the second position. The interface also is includes a plank portion 104 which extends into said track 73.

The series of gears 66 are configured to allow the pinion 64 to rotate in direction 75 with little resistance, the gears are said to be free wheeling when the pinion rotates in direction 75. The gears are configured to provide maximum resistance to rotation of the pinion in direction 77. In more detail the series of gears when the pinion rotates in direction 77 moves an energy absorber 79 which in the present embodiment is an oscillating member. When the pinion 64 rotates in direction 75 the gears do not move energy absorber 79. The gears do not move energy absorber 79 because when pinion 64 moves in direction 75 gear 82 moves in direction 75. Gear's teeth 83 do not engage with the teeth 84 of gear 90. Gear 90 is thus not turned.

Although springs are used, other members having resilient constructions such as elastic members can be used. For instance spring 34 could be replaced by a compressible rubber or foam member.

The invention claimed is:

1. An assembly forming part of a water flow detector, said assembly comprising:
   a mount plate;
   an electronic switch assembly carried by the mount plate;
   a lever coupled to said mount plate,
   a gear assembly comprising a rack that is responsive to said movement of said lever member;
      wherein when said lever is in a first position said rack is in a first position and
   wherein when said rack is in a second position said lever is in a second position;
      wherein when said rack and lever are in said first position said switch assembly is in a first state and wherein when said rack is in a second position and said lever is in a second position, said switch assembly is in a second state;
      wherein said switch assembly is responsive to movement of said gear assembly;
   a cam, said cam moveable between a first position and a second position,
      wherein when said cam is in said first position said switch assembly is in said first state; and
      wherein when said cam is in said second position said switch assembly is in said second state.

2. The assembly of claim 1 wherein when said rack is in said first position said rack provides a set maximum interference to an interface reaching a second position from a first position.

3. The assembly of claim 2 wherein when said rack is in said second position said interface is in said second position.

4. The assembly of claim 3 wherein when said lever is in said first position said interface is in said first position and wherein when said interface is in said second position said lever is in said second position.

5. The assembly of claim 4 wherein when said lever is in said first position said lever is abutting up against said interface and when said lever is in said second position said lever is off of said interface.

6. The assembly of claim 5 wherein said gear assembly includes a pinion intermeshed with said rack.

7. The assembly of claim 6 wherein a series of gears are responsive to movement of said pinion.

8. The assembly of claim 7 wherein said pinion is rotatable in a first direction and an opposite second direction; a greater amount of resistance inhibits rotation of the pinion in said first direction as opposed to said second direction.

9. The assembly of claim 8 wherein when said pinion turns in said first direction all of said gears forming said series of gears turns along with the pinion and wherein when said pinion turns in said second direction one of said series of gears does not turn along with said pinion.

10. The assembly of claim 2 wherein said set maximum is variable.

11. The assembly of claim 1 wherein said rack is coupled to a track.

* * * * *